(12) United States Patent
Patel et al.

(10) Patent No.: US 9,151,022 B2
(45) Date of Patent: Oct. 6, 2015

(54) AUTOMATIC VALVE SHUTOFF DEVICE AND METHODS

(71) Applicant: UNIVERSITY OF WASHINGTON THROUGH ITS CENTER FOR COMMERCIALIZATION, Seattle, WA (US)

(72) Inventors: Shwetak N. Patel, Seattle, WA (US); Timothy B. Campbell, Beaverton, OR (US); Eric C. Larson, Seattle, WA (US); Gabriel A. Cohn, Sammamish, WA (US)

(73) Assignee: University of Washington Through Its Center for Commercialization, Seattle, WA (US)

( * ) Notice: Subject to any disclaimer, the term of this patent is extended or adjusted under 35 U.S.C. 154(b) by 0 days.

(21) Appl. No.: 14/371,393

(22) PCT Filed: Jan. 11, 2013

(86) PCT No.: PCT/US2013/021203
§ 371 (c)(1),
(2) Date: Jul. 9, 2014

(87) PCT Pub. No.: WO2013/106690
PCT Pub. Date: Jul. 18, 2013

(65) Prior Publication Data
US 2015/0013772 A1 Jan. 15, 2015

Related U.S. Application Data

(60) Provisional application No. 61/640,822, filed on May 1, 2012, provisional application No. 61/585,537, filed on Jan. 11, 2012.

(51) Int. Cl.
| *F16K 37/00* | (2006.01) |
| *E03B 7/07* | (2006.01) |
| *F16K 31/12* | (2006.01) |
| *F15B 20/00* | (2006.01) |
| *G01M 3/16* | (2006.01) |
| *F16K 17/40* | (2006.01) |

(52) U.S. Cl.
CPC ............ *E03B 7/071* (2013.01); *F15B 20/005* (2013.01); *F16K 17/40* (2013.01); *F16K 31/12* (2013.01);
(Continued)

(58) Field of Classification Search
CPC .............. F16K 17/38–17/386; F16K 17/14; F16K 37/0075; F16K 31/12; E03B 7/071; G01M 3/16; F15B 20/005; F15B 2211/8755; F15B 2211/87; F15B 2211/21; F15B 2211/8855; F15B 2211/632; F15B 2211/7107; Y10T 137/0318
USPC ........... 251/292, 129.04; 137/15.11, 312, 67, 137/68.18, 72
See application file for complete search history.

(56) References Cited

U.S. PATENT DOCUMENTS

| 1,831,021 A * | 11/1931 | Markel ........................ 137/65 |
| 4,270,849 A * | 6/1981 | Kalbfleisch ................ 251/292 |

(Continued)

OTHER PUBLICATIONS

International Search Report and Written Opinion for International Application No. PCT/US2013/021203 mailed 24, 2013.

*Primary Examiner* — John Bastianelli
(74) *Attorney, Agent, or Firm* — Dorsey & Whitney LLP (57) ABSTRACT

Examples of automatic valve shutoff systems are described which may include an actuation device including an actuator and a valve attachment portion. The valve attachment portion may be configured for attachment with an existing valve in a fluid or compressible gas supply line. The system may further include a controller coupled to the actuation device, wherein the controller is configured to initiate a valve shutoff process in response to a wireless signal. Wake-up circuitry may be coupled to the controller and configured to monitor the supply line for vibrations and activate the controller in response to the vibrations.

11 Claims, 3 Drawing Sheets

(52) U.S. Cl.
CPC ............ *F16K 37/0075* (2013.01); *G01M 3/16* (2013.01); *F15B 2211/21* (2013.01); *F15B 2211/632* (2013.01); *F15B 2211/7107* (2013.01); *F15B 2211/87* (2013.01); *F15B 2211/8755* (2013.01); *F15B 2211/8855* (2013.01); *Y10T 137/0318* (2015.04)

(56) References Cited

U.S. PATENT DOCUMENTS

| | | | | |
|---|---|---|---|---|
| 4,324,268 A | * | 4/1982 | Jacobson | 137/312 |
| 4,365,643 A | * | 12/1982 | Masclet et al. | 137/70 |
| 4,869,459 A | * | 9/1989 | Bourne | 251/58 |
| 4,938,453 A | * | 7/1990 | Blanchard | 251/313 |
| 5,409,037 A | | 4/1995 | Wheeler et al. | |
| 5,655,561 A | * | 8/1997 | Wendel et al. | 137/79 |
| 5,771,916 A | * | 6/1998 | Armenia et al. | 137/67 |
| 5,813,655 A | * | 9/1998 | Pinchott et al. | 251/129.04 |
| 5,967,171 A | | 10/1999 | Dwyer | |
| 6,123,093 A | | 9/2000 | D'Antonio et al. | |
| 6,206,337 B1 | * | 3/2001 | Veillet, Jr. | 251/67 |
| 6,397,835 B1 | * | 6/2002 | Liang | 126/92 B |
| 6,662,821 B2 | | 12/2003 | Jacobsen et al. | |
| 6,792,967 B1 | * | 9/2004 | Franklin | 137/312 |
| 7,066,192 B1 | | 6/2006 | Delaney et al. | |
| 7,424,896 B1 | * | 9/2008 | Martin et al. | 137/312 |
| 2007/0289635 A1 | * | 12/2007 | Ghazarian et al. | 137/312 |

* cited by examiner

AUTOMATIC VALVE SHUTOFF DEVICE AND METHODS

CROSS-REFERENCE TO RELATED APPLICATION(S)

This application claims the benefit of the earlier filing dates of U.S. Provisional Application 61/585,537, filed Jan. 11, 2012, entitled "Hydrostop: Wireless water shutoff for leaks and water damage protection," and U.S. Provisional Application 61/640,822, filed May 1, 2012, entitled "Hydrostop: Wireless water shutoff for leaks and water damage protection," which applications are hereby incorporated by reference in their entirety for any purpose.

TECHNICAL FIELD

Examples described herein relate generally to an automatic valve shutoff system and methods for automatically shutting off a valve.

BACKGROUND

Statistics show that water damage from leaks, in the context of residential water supply, may account for almost a quarter of all homeowner property losses, which can add up to a staggering 9.1 billion USD annually. Water supply lines typically have a line that may be turned off by manually rotating a valve in the water supply line.

While several automatic water shutoff systems exist on the market, existing automatic devices typically require the installation of a separate valve, in addition to the existing manual shut-off valve. Installing the separate valve requires cutting into the existing pipes, necessitating a professional installation by a plumber or other trained technician, significantly raising the cost to the consumer. In addition, existing automatic water shutoff valves are typically powered by electrical motors. As such, automatic shutoff valves typically need to be installed near an electrical power source or otherwise provided with sufficient battery power, which may require replacement depending on the frequency of the usage of the valve.

These and other shortcoming of existing automatic valve systems may limit widespread adoption of automatic valve shutoff devices by consumers, which as described results in losses that could be prevented.

SUMMARY

Examples of valve actuation devices and methods for automatically actuating a manual valve, also referred to herein as an existing valve, are described herein. An exemplary valve actuation device may include an actuator configured to be activated using an activation signal. The valve actuation device may further include a valve attachment portion configured for attaching the actuator to an existing valve, the device being further configured such that the actuator, once activated, is operable to turn the existing valve via the attachment portion and in some instances, without the use of electrical power. In some examples, the actuator may be mechanically driven, while in other examples, the actuator may be an electrically driven actuator, such as a motor. In some examples, the activation signal may be a wireless signal, which may be generated elsewhere not by the device and transmitted to the device wirelessly. In some examples, the activation signal may be a signal generated by pressing a button on the device.

The valve attachment portion of the valve actuation device may include a removable adapter configured for attachment with a select one of a plurality of valve types. The valve attachment portion may be configured to engage with the existing valve without necessitating removal of the existing valve. In some examples, the valve handle may be removed to allow for the actuation device to be placed in engagement with the valve stem of the existing valve. In other examples, the actuation device may be configured to engage the valve stem of the existing valve without requiring removal of the handle of the exiting valve. In examples according to this disclosure, subsequent manual operation of the existing valve may be possible as the manual valve may not need to be removed and/or replaced as may be required with conventional automatic valve systems.

The actuator may be driven using any of a variety of sources of stored potential energy. In examples, the potential energy may be stored in a loaded spring, a gravitational system, a pressure system (e.g. a variety of pneumatic solutions described herein), a combustion system, or combinations thereof.

In some examples, the actuator may be powered using pneumatic pressure. For example, the actuator may include one or more pneumatically-powered rotary or linear actuators, which may be coupled to a gearing mechanism for transmitting the motion generated by the pneumatically-powered actuators to the attachment portion. In certain examples, the actuator may be operable to turn the existing valve in a first direction, and may also be operable to turn the existing valve in a second direction opposite the first direction. In examples where the actuator is a powered by pneumatic pressure, the device may further include a source of pneumatic pressure, for example a container of pressurized gas. The container of pressurized gas may be coupled to the pneumatically-powered actuator using a barrier, which may be disposed between an outlet of the container and an inlet port of the actuator such that the barrier prevents gas from releasing into the actuator and driving motion while the device is in an idle state.

In some examples, the valve actuation device may include a controller configured to remove or puncture the barrier in response to the activation signal. In examples, the barrier may be punctured using a puncture device, or it may be removed by compromising the barrier (e.g. using a chemical reaction to melt a tab keeping the gas container sealed) thereby allowing the gas to flow to the actuator. In examples, the barrier removal device may include a puncture device and/or a controller-driven valve, for example a flow control valve like a Schrader valve or a PSI meter. In examples, the barrier removal device may include a pressure regulator.

Automatic valve shutoff systems for use with essentially any type of an existing valve in a fluid supply line are described herein. An exemplary system may include an actuation device, including an actuator and a valve attachment portion, the valve attachment portion being adapted for attaching the actuation device to the existing valve. In some examples, the actuator may be a gas-powered rotary actuator, the actuation device further including a compressed gas cartridge configured to drive the rotary actuator upon the removal of a barrier disposed between the actuator and the cartridge. In examples, the actuation device may also include one or more of a pressure regulator or a flow control valve for controlling a flow or pressure of the gas contained in the cartridge, for example prior to providing said gas to the actuator.

The automatic valve shutoff system may also include a controller coupled to the actuation device and configured to initiate a valve shutoff process in response to an activation signal received by the controller. The system may also include a wake-up device coupled to the controller and configured to detect a flow through the fluid supply line and activate the controller in response to said flow. In this manner, the controller may generally be provided in a standby or sleep mode such that it does not consume electricity until activated by a wakeup device. The wake-up device, in some examples, may utilize an accelerometer, a flow sensor, a vibration sensor, a ball switch, a reed switch, a hall effect sensor, or combinations thereof for detecting flow through the fluid supply line. In some examples, the controller may be configured to remain in active mode while fluid is flowing through the supply line and for a predetermined period of time after the flow stops, and may subsequently be placed back into sleep mode to conserve battery power. While the controller is in active mode it may be configured to receive the activation signal, which may be a wireless signal generated remotely from the actuation device and transmitted to the controller wirelessly.

Methods of closing or opening a manual valve which may be coupled to a conduit for flowing a fluid therethrough are described herein. An example method may include receiving a signal indicative of an instruction to close the manual valve, in response to the signal, removing a barrier provided between a source of stored potential energy and a actuator coupled to the manual valve, and rotating the manual valve using the actuator. Receiving a signal may include receiving the signal wirelessly using a controller. The method may include generating the signal in response to having detected a leak or in response to a user pushing a button.

In certain examples, removing the barrier may include puncturing the barrier using a puncture device, or in some example, removing the barrier may include releasing a loaded spring. In other examples, removing of the barrier may include melting the barrier using a chemical process. According to some examples, the method may also include maintaining the controller in sleep mode until the controller is activated responsive to flow through the conduit. The method may further include monitoring the conduit to detect a flow therethrough, and activating the controller responsive to having detected said flow, wherein the monitoring may include monitoring vibrations of the conduit, for example by using a tilt switch. The method may include generating the signal in response to having detected a leak or in response to a user pushing a button.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

Examples described herein relate generally to an automatic valve shutoff system and methods for automatically shutting off a valve of a supply line, for example a water supply line to a residential or commercial property. While the examples described herein are primarily discussed in the context of water supply lines, it will be understood that the systems and methods disclosed are equally applicable and can be used in the context of any other fluid system, such as with gas supply lines or oil pipe lines. Generally, examples of the present invention may be used with any fluid line carrying a gas or liquid. Accordingly, the particular examples provided herein are for illustration purposes only and are not to be taken in a limiting sense.

In the context of residential water supply systems, for example, a manual shut-off valve is typically provided in or near the home and coupled the main water supply line (e.g. the water main). Typically homes may have one or more manual shut off valves that can shut off the flow from the water main or localized sections of the water supply. For instance, where the water main enters the house, there may often be such a manual shut off valve. In cold weather locations, the shut off may be in the basement or elsewhere inside the house. As will be understood a manual valve is a valve which can be operated by manually turning a handle or lever to the closed position (e.g. a typical water shutoff valve may be of the rotary type in that it is rotated to the closed position stopping the flow of water downstream from the valve). If a leak is detected or if maintenance or other reasons necessitate the shutting off of the supply of water into the home, the homeowner or plumbing professional manually turns the valve to the off position. In the case of a water leak, unless the water leak is visually observed and the person is in the home to turn off the water, water will continue to flow into the home potentially resulting in significant damage and losses to the homeowner.

As discussed above, some existing water shutoff systems exist. However, conventional automatic water shutoff systems may have numerous disadvantages. For example, such shutoff systems typically involve the installation of a separate electrically actuated shutoff valve in-line with the water flow. That is, the additional valve is installed in-line with the existing manual shutoff valve, which must either be accomplished during the initial installation of the plumbing in the home/building or may necessitate cutting into the existing plumbing. Such an installation not only entails a level of inconvenience for the consumer, but also typically requires professional installation, adding significant cost to the consumer. Furthermore, such devices are generally more costly to acquire and operate as they include electronics and require the consumption of electricity. Examples of disadvantages are described herein by way of illustration. It is to be understood that not all embodiments of the present invention solve all, or even any of the described disadvantages of existing systems.

Figure 1:
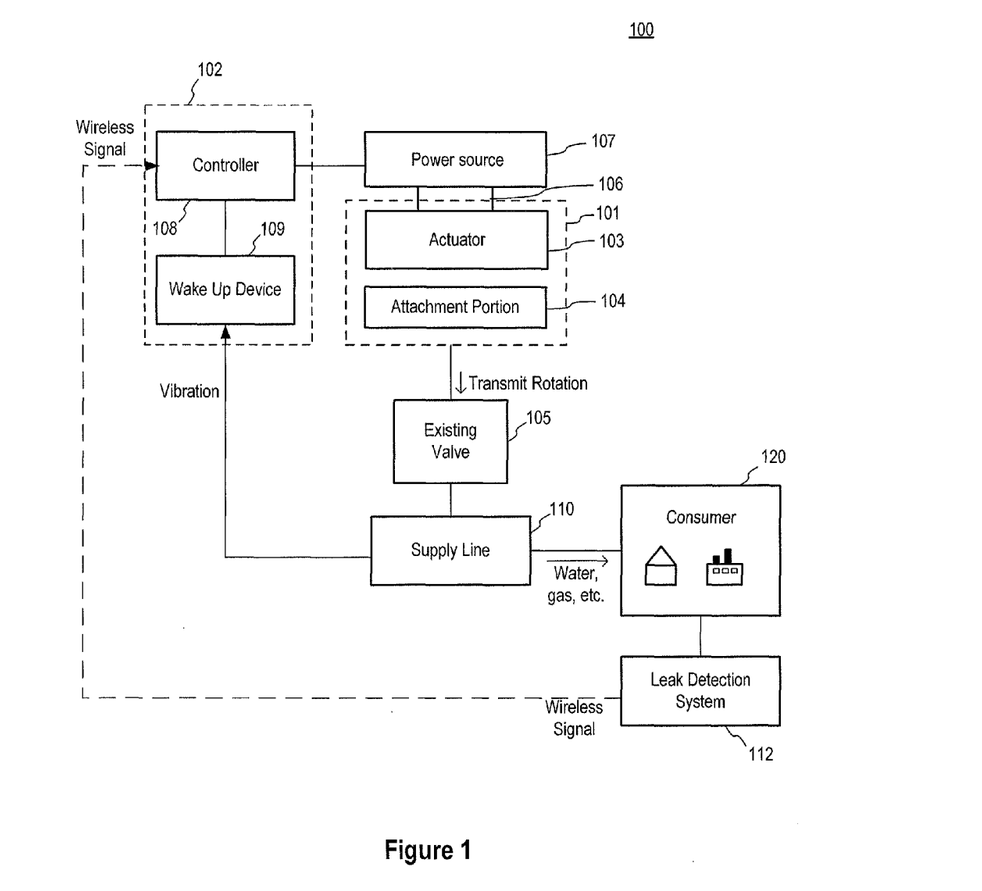
FIG. 1 is a schematic illustration of an exemplary system according to the present disclosure.

FIG. 1 is a schematic illustration of an automatic valve shutoff system according to examples of the present disclosure. An automatic valve-shutoff system 100 according to the present disclosure may include an actuation device 101 and an activation portion 102. The actuation device 101, interchangeably referred to herein as valve shutoff device or valve actuation device, may include an actuator 103 and an attachment portion 104, also referred to herein as valve attachment portion. In some examples, the actuator 103 may be a mechanically-powered actuator in that it may not require electrical power to generate motion or actuation as may be needed to turn the existing valve, and as will be further described. For example, the actuator 103 may be a pneumatically-powered actuator configured to generate a rotary motion. In other examples, the actuator 103 may be powered by any other type of non-electrical power source. The actuator 103 may be implemented as virtually any type of actuator (e.g., linear, rotary, or the like) and may be configured to be powered by substantially any source of stored potential energy, for example potential energy stored in a pneumatic system (e.g. pressure source), a loaded spring, a gravitational system, a combustion system, or the like. One advantage of using a stored potential energy solution instead of an electrically-power solution may be to enable installation of the device at remote locations, which may not have access to the electrical power grid. Other advantages of the examples herein will be appreciated by those skilled in the art, some of which will be further described below.

In other examples, the actuator 103 may be an electrically driven actuator, for example a motor. The actuator 103 may be adapted to source power directly from the grid (e.g. by plugging the actuator, which may be a motor-type actuator to an electrical outlet), or from a battery or any other type of energy source, for example solar or wind power. Depending on the particular configuration, intermediate components may be used to convert the energy from the particular power source to the type of energy needed to drive the actuator. Many different implementations or configurations will become apparent from the present disclosure.

An example of an automatic valve shutoff system is described in further detail below, however the particular examples provided herein are for illustration only and are not meant to be limiting. In some examples a pneumatically-driven solution may be implemented using one or more rotary or linear actuators (e.g. piston type actuator), as examples. In examples, the actuator 103 may be a rotary actuator which is configured to generate a rotary motion responsive to applied pneumatic pressure. The actuator 103 may be implemented as a piston and cylinder type device (e.g. a piston coupled to a rack and pinion gearing mechanism to convert the linear motion of the piston to the desired rotary motion). In this configuration, pneumatic pressure, for example, may be used to translate the piston and thus the rack gear, thereby causing rotation of the pinion gear and the valve to which the actuator is attached. In other examples, the actuator 103 may be implemented using one or more rotating vanes enclosed in a cylinder or chamber (e.g. an impeller-type rotary device), wherein pneumatic pressure is provided through a port in the cylinder wall to its interior and applied to one side of the one or more vanes to cause the vanes to rotate within a cylinder. In examples using impeller-type actuators, an amount of pressurized gas may be released into the chamber, the expansion of the gas causing the impeller to rotate the vanes. In examples, the gas released into or provided to the chamber may not be contained within the chamber without venting it to the atmosphere. Minimizing release of the gas into the atmosphere may be desirable from the standpoint of conserving resources (e.g. gas consumption may be minimized) and may further provide a predictable amount of force. In this manner, a source of pressurized gas can be used to generate the desired rotation of the vanes, which can then be used to rotate an existing valve into a closed position. Any known structures and technique for implementing a mechanical (e.g. fluid powered) rotary actuator known in the art or later developed may be used without departing from the scope of the present invention. For example, a compact rotary air actuator providing 15.6 in-lbs Torque at 70 PSI, with 270 degree shaft rotation, commercially available from McMaster-Carr (product number #6508K143), may be a suitable actuator 103 for an exemplary device according to the present disclosure.

The valve attachment portion 104 of the actuation device 101 may be configured to allow the actuation device 101 to be attached to an existing valve 105. The existing valve 105 may be, for example, the main manual shutoff valve or a cutoff valve for any portion of a building, or valve 105 may be any other manual valve which a user desires to actuate automatically or remotely. The attachment portion 104, which will be described in further detail below, may be adapted for mechanical engagement with substantially any valve stem and may be implemented as a modular component which can be replaced to fit the desired valve. In this manner, the actuation device 101 may be retrofitted to any of a variety of existing manual shut off valves, such as the cutoff valve for a water main for example, without requiring replacement of the manual valve or the installation of an additional valve as is typically needed with existing automatic valve shutoff systems. Moreover, in some examples the attachment portion 104 may be detached and replaced with a different attachment portion, allowing a same actuator 103 to be connected to multiple valve types depending on the attachment portion used.

The actuation device 101 may include or be otherwise coupled to a power source 107. The power source 107 may be an electrical power source (e.g., electrical energy sourced from the grid or a battery) or it may be non-electrical power source, for example, a pneumatic pressure source, a loaded spring, or other sources of stored potential energy. In some examples the power source 107 may be container enclosing a compressed gas. In other examples, the pneumatic pressure source may be substantially any device or mechanism configured to deliver a pressure for driving the actuator 103. In other examples, the source 107 may be implemented using other sources of mechanical energy where the actuator 103 is driven by other than pneumatic pressure.

In examples implemented using a pneumatic pressure source, the source may be a container enclosing a pressurized gas, such as air or $CO_2$, or it may be any other source of compressed gas. The pneumatic pressure source (e.g. power source 107) may be an inexpensive commodity type $CO_2$ cartridge, which may be readily commercially available. The actuation portion 101 of the device 100 may further include a puncture device effectively coupled to the pneumatic actuator 103 and the pneumatic pressure source 107 and configured to puncture or otherwise remove the barrier 106. The puncture device may be any mechanism adapted to remove or puncture the barrier 106 between the pressurized gas source to allow for gas to be released into the actuator 103. In the case of a $CO_2$ cartridge functioning as the pressure source, the puncture device 106 may be implemented as a shrader valve and a linear actuator adapted to press the spring-loaded stem of the shrader valve so as to open the flow of gas. In some examples, an electronic solenoid may be provided between the commodity cartridge (e.g. pressure source 107) and the actuator 103. Other form factors and implementations for the puncture device may be used, and such variations do not depart from the scope of the present invention. Depending on the implementation of the power source, the puncture device, in some examples, may be non-mechanical. In examples, the barrier or puncture device may be implemented using electrical means, for example using a solenoid type valve. In examples, the barrier may be removed or punctured using a chemical reaction, for example by burning or melting a tab which is used to close the opening of the pressure source. The barrier may be used to maintain the pressure in the pressure source (e.g. gas container) and thereby removal of the barrier initiates the flow of pressurized gas thereby releasing the stored energy.

In some examples, the pneumatic pressure inside the pressure source 107 may be too high for it to be directly provided to the actuator, and at certain pressures, the gas may exit the cartridge (e.g. pressure source 107) as partially liquid and partially gas depending on the percent of rated fill. Accordingly, the device 100 may be provided with pressure regulation in embodiments of the present invention, to regulate the pressure of the gas exiting the source 107. Any conventional regulator may be used, and in some examples flow control valves currently known or later developed may be used to control the flow of gas and/or rate of filling the chamber of the actuator.

For example, in the case of a commodity 12 g $CO_2$ cartridge, the PSI inside the cartridge can range between 750 PSI and 1200 PSI under certain conditions, such as in a hot climate, which may be too high for feeding it directly into the actuator according to certain example. A 15.6 in-lbs compact rotary air actuator (e.g., McMaster-Carr product number #6508K143), for example, is limited to 140 PSI by manufacturer specifications. Thus, a pressure valve or regulator may be provided to regulate the pressure down to the desired pressure. Using a pressure regulator may allow for stepping down the pressure in a controlled manner (e.g. by stepping it down by an adjustable amount to the desired PSI). In some examples, a schrader valve may be used to reduce the pressure of the exiting gas to a range of about 110-230 PSI. In some examples, a pressure regulator may be used to regulate the pressure of the exiting gas more precisely to substantially any desired PSI between about 5 PSI and about 250 PSI. When stepping down the pressure with a pressure regulator, an electronic solenoid controlled valve may be used to control the flow of pressurized gas from the outlet of the regulator to the inlet of the actuator. The solenoid controlled valve may normally be closed when the solenoid is not energized. A DC signal, for example 10V DC, may be applied to the solenoid to open the valve, allowing pressurized $CO_2$ to enter the actuator.

Under normal conditions, the $CO_2$ cartridge (e.g. pressure source 107) sits idle under pressure against the regulator with the solenoid or puncture device remaining closed. When a wireless signal is received by the wireless solenoid controller, the controller causes the solenoid valve to remove the barrier 106 between the $CO_2$ cartridge and the rotary actuator 103 (e.g. puncture the gas cartridge) thereby allowing the pressurized gas to release and expand into the chamber of the actuator 103. Pressurized $CO_2$ exiting the cartridge into the rotary actuator causes the actuator to rotate the valve stem through the valve attachment thereby stopping the flow of water or other fluid flowing through the conduit. As described above, the device may be configured to turn the valve in a first direction to close the valve, and/or it may be configured to turn the valve in the opposite or both directions to close and re-open the valve. In some examples a single cartridge may be used to obtain a single rotation of the valve. That is, in some examples, the cartridge may need to be replaced before the valve may be actuated a second time using the shutoff device. In some examples, the device may be further provided with a latch mechanism such that the device is configured to latch after the valve has been rotated to prevent rotation of the valve a second time or in the opposite direction. In examples, the device may need to be reset and/or the cartridge replaced before using the device to actuate the valve a second time.

The activation portion 102 of the automatic valve shutoff system 100 may include a controller 108 and a wake-up device 109. The controller 108 may include a receiver for receiving wireless signals, and may provide a signal to the puncture device responsive to the received wireless signals. In this manner, the controller 108 may initiate a valve shutoff operation in response to receiving a predetermined wireless signal indicative of a water leak or other desired shut-off condition. For example, the controller 102 may be implemented as a solenoid which is coupled to a solenoid controlled valve serving as the puncture device. In this example, upon receipt of a wireless signal, the solenoid may be energized, opening the valve (e.g. puncturing barrier 106) allowing pressurized gas to flow from pneumatic pressure source 107 to the actuator 103. The actuator, responsive to the pressure, generates rotation which is transmitted to the existing valve stem or valve handle via the attachment portion 104. In some examples, the controller may be configured, responsive to an activation signal, to remove a barrier provided between the power source and the actuator. Other variations of initiating or triggering the actuator may be used without departing from the scope of the present disclosure.

The controller 108 of the present disclosure may be a low-voltage device which is configured to remain in standby/sleep mode during the majority of the time to reduce or minimize the electrical power consumption of the system 100. A wakeup mechanism or device 109, which may include circuitry, may be provided and coupled to the controller 108 such that the controller 108 is active or switched to ON/"listen" mode only during certain times, such as when water is flowing thought the conduit (e.g. supply line 110). Having the controller 108 ON and consuming power generally only when a shut-off signal is likely be received (e.g. when water is flowing) may minimize or reduce the power consumed. In examples, the wake-up device 109 may include circuitry configured to monitor the supply line for vibrations or otherwise detect the flow of a fluid therethrough. Responsive to having detected a flow, the wake-up device or circuitry may activate the controller 108. In some examples, the wake-up device 109 may include a flow sensor, or it may include a sensor configured to detect vibrations of the flow meter. In some examples, when a tap or spigot sourcing water from the supply line is turned on, vibrations may be generated at the tap and/or at other locations along the supply line, thereby allowing the system to sense these vibrations from the outside of the supply line (e.g. sensing the vibrations at a surface external to the flowing water), and thereby activate the controller 108 in response to the sensed vibrations.

For example, the wake-up mechanism or circuitry 109 may be implemented as a mechanical vibration sensor which may monitor vibrations in the conduit and/or meter system. In examples, the wake-up mechanism or device 109 may include any suitable tilt sensor, for example a ball switch. In some examples, the wake-up mechanism or device 109 may incorporate a piezoelectric sensor which may detect accelerations (e.g. due to vibration of the conduit as described). Vibrations in the supply line 110 will generally be present when water is flowing, and may not be present when water is not flowing. Some false positives may occur, due to other causes of vibration (e.g. earthquake, truck traffic), however, even with false positives, the operation of the wake-up device 109 may reduce or minimize power consumed. As will be appreciated, the wake-up mechanism may be implemented using any conventional or later developed vibration sensor and the examples described are for illustration only and not to be taken in a limiting sense. Other triggers may be used to initiate a wake-up, including but not limited to a timer to turn the controller 108 on at certain times, a flow sensor to turn the controller 108 on responsive to flow in the supply line 110, etc. The wake-up device 109 may provide a signal to the controller 108 to turn the controller on. The controller 108 may remain on responsive to the signal received from the wake-up circuitry for a predetermined amount of time, or in some examples may remain on as long as the signal continues to be provided from the wake up device 109.

When fluid (e.g. water) is flowing through a conduit of the system 100 (e.g. supply line 110), the supply line and/or meter system may vibrate at specific resonant frequencies. The wake-up mechanism or device 109 may be configured to monitor for the particular frequency or frequencies and, responsive to the vibrations, activate the controller 108. When water is no longer flowing through the conduit, the vibrations may cease and the wake-up device 109 may again place the controller 108 in standby or sleep mode. In this manner, electrical power needed by the controller 108 may sufficiently be supplied using only a small battery, such as a coin cell battery. In some examples, the system may include a solar panel to provide the minimal amount of intermittent power required during "listen" mode or to recharge a battery powering the controller 108.

In some examples, wireless activation of the actuation portion 101 can be achieved using a microcontroller (for example an MSP430) with a receiver/antennae. In the example where a solenoid controlled valve is used for a puncture device, the microcontroller (e.g. controller 108) may be configured to receive the wireless signal which is indicative of a "water shutoff" command. The microcontroller (e.g. controller 108) may be configured to apply a digital signal to a relay or power transistor which may be configured to energize the solenoid and open the solenoid controlled valve (e.g. puncture device). In some examples, such as when using a shrader valve type puncture device, the microcontroller (e.g. controller 108) may be configured to send a pulse width modulation signal to the linear actuator configured to press the shrader valve (e.g. puncture device).

The exemplary automatic valve shutoff system 100 shown in FIG. 1 may further include a leak detection system 112. The leak detection system 112 may use one or more sensors distributed through a building or other site fed by the supply line 110. For example, a plurality of moisture or flood sensors may be distributed throughout a home or other building, and typically may be positioned near water consuming devices and appliances to monitor for leaks. When a leak is detected, a wireless signal may be sent from an individual leak detection sensor or from a central control panel configured to communicate with each of the individual leak detection sensors. In some examples, the leak detection system may be configured to communicate with a monitoring system which is not located in the building or site, or which may be operated by a third party. The monitoring system may then generate the wireless signal needed to activate the controller 108 and may also send an alert or other information to the building or site owner. As described above, upon receipt of the wireless signal by the controller 108, the controller 108 may operate the puncture device and or otherwise remove the barrier 106 to open the flow of gas from the pressurized gas source 107 to the inlet port of the actuator 103. Gas expanding into the chamber of actuator 103 may cause rotation and torque to be applied to the existing valve 105 shutting off the flow through supply line 110.

In some examples, the controller 108 of the automatic valve shutoff system 100 may be configured to monitor the health of the system. As described herein, the pressure source 107 may be a disposable gas container or cartridge. In examples, the automatic valve shutoff system may be operable to perform multiple instances of opening and closing of the valve 105 prior to necessitating replacement of the cartridge. In some examples, a health monitoring sensor, such as a pressure sensor, may be provided and adapted to monitor the pressure in the one or more cartridges (e.g. pressure source 107), such that the controller 108 may detect when the pressure in the cartridges is too low to operate the valve, sending an alert to the homeowner or a third party to service the system.

Figure 2A:
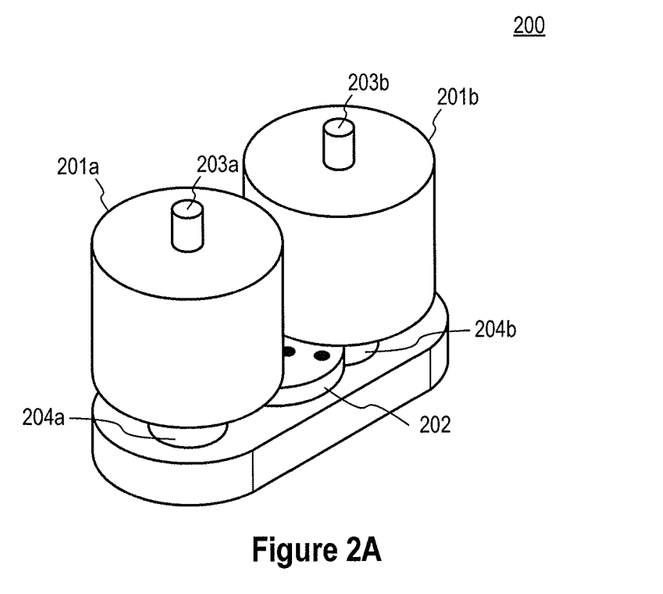
FIG. 2A is a schematic diagram showing a top isometric view of an exemplary valve actuation device according to an embodiment of the present disclosure.
Figure 2B:
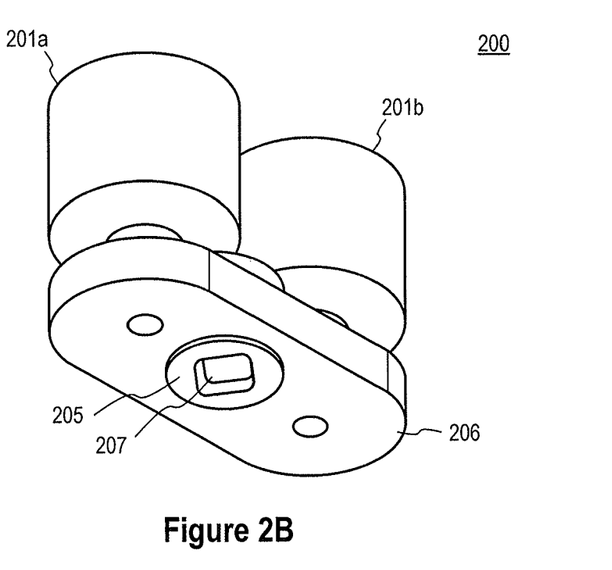
FIG. 2B is a bottom isometric view of the exemplary valve shutoff device in FIG. 2A.

FIGS. 2A and 2B are schematic diagrams showing top and bottom isometric views, respectively, of an exemplary valve actuation device according to an embodiment of the present disclosure. As described with reference to FIG. 1, the automatic valve shutoff system may include a pneumatic actuator which may be implemented as the device 200 depicted in FIGS. 2A and 2B. The device 200 in the example of FIGS. 2A and 2B includes two rotary actuators 201a, 201b. The two actuators 201a, 201b are arranged on opposite sides of a central gear 202. The rotation generated by the actuators 201a, 201b is transmitted via the shafts 203a, 203b to respective planetary gears 204a, 204b. The planetary gears 204a, 204b are in engagement with the central gear 202 such that rotating the gears 204a, 204b causes the central gear 202 to rotate. As will be appreciated, any number of rotary actuators may be used. While two actuators 201a and 201b are shown in this example, fewer or more actuators may be used depending on the desired power/torque output of the actuation device. In some examples, four actuators may be used with the actuators being arranged at the 12, 3, 6, and 9 o'clock positions around the gear 202. Also, a different gearing ratio may also be used to vary the speed and torque applied to the valve handle or stem of the existing valve.

The central gear 202 may be mechanically coupled to an attachment portion (e.g. adapter) 205 provided in the base 206 such that the attachment portion rotates synchronously with the central gear 202. The attachment portion 104 described above with reference to FIG. 1 may be implemented using the attachment portion 205 shown in FIG. 2B, for example. Referring again to FIG. 2B, the attachment portion 205 may be configured to fit over any of a variety of valves. For example, the attachment portion 205 may include a socket or cutout 207 for receiving an end of a valve stem. As previously described, the attachment portion 205 may be a modular component in that it may be removable and replaceable with another attachment portion having a differently shaped socket or cutout 207. In this manner the automatic valve shutoff device may be configured to be used with any number of different valves having different shapes and sizes. As described, the attachment portion 205 may enable the actuation device 200 to sit on top of the existing valve and engage with the stem at any suitable portion of the stem such that it does not interfere with the operation of the handle of the valve. In some examples, the attachment portion 205 may be configured to engage with any other portion of the valve stem, other than the top end portion of the stem, for example.

As will be understood, in preferred examples, the device 200 does not interfere with the manual operation of the existing valve, and may in fact offer additional advantages, such as leverage obtained through the gearing of the device 200. The water company and/or home or building owner may still be able to operate the existing valve manually irrespective of the presence of the valve actuation device 200. In some examples, the device 200 may be placed over or on top of the existing valve and the existing valve's handle is accessible such that a person can turn the handle without using the actuation provided by the device (e.g. without firing the actuator). In some examples, the handle of the existing valve may be removed and different handle may be installed after the installation of the valve actuation device. In some examples, the device 200 may engage with the existing valve such that removal of the existing valve or handle is not required.

If desired, in some examples, the handle of the existing valve may be removed and/or replaced with the automatic valve shutoff device described, such that actuation of the existing valve is achieved only through operating the automatic valve shutoff device. As described herein, in some examples, the automatic valve shutoff device may include a button to allow the consumer to manually activate the device by pressing it, thereby operating the valve analogously to operating the manual valve. In some examples, a user may actuate a button on a remote control which generates the wireless signal for turning the valve via the device 200. Furthermore, while examples of retrofitting, and systems for attaching the valve shut off system to existing valves have been described, in some examples, an automatic shutoff system according to embodiments described herein may be provided during an initial installation of any shut off valve of any fluid line.

Referring back to the example in FIG. 2, the actuators 201a, 201b may be configured to generate rotation in response to pneumatic pressure, for example. In some examples, the actuators 201a, 201b may be configured to rotate in a first direction, for example the clockwise direction for closing the valve. In other examples, the actuators 201a, 201b may be configured to turn the valve in the opposite direction, as will depend on the natural operation of the valve. Examples may be implemented to turn the valve a first direction, for examples clockwise, to close the valve and in a second direction (e.g. counterclockwise) to re-open the valve. This can be achieved by using a diverter to re-direct the flow of pressurized gas relative to the rotary actuator's vane, for example. In some examples, the rotary actuation may be provided with a plurality of inlet ports, for example two ports, one for providing gas flow to rotate the shaft of the actuator in a first direction and one for rotating the shaft the opposite direction. As discussed above, in some examples, the automatic valve actuation device may be configured to turn the valve in only one direction (e.g. to close the valve).

As described herein, in some examples an outlet of the gas source (e.g. pressure source 107) may be fluidly coupled to an inlet of one or more rotary actuators, such as the actuators 201a, 201b, through the barrier or puncture device. The actuators 201a, 201b may in some examples be compact rotary air actuators, as described above. Once the barrier is removed or punctured, pressurized gas flows into the rotary actuators. An exemplary compact air actuator may respond to pressures of up to 140 PSI with a 270 degree turn of the shaft. In some examples, the 270 degrees of rotation may be converted to about 100 degrees using a 2.67:1 gearing ratio. Such gearing down of the revolutions may increase the torque applied to the valve handle, and accordingly, at 140 psi, the pair of rotary actuators may generate about 31 in-lb torque which may be stepped up to about 83 in-lb torque using the gearing described above. In the present example, each of the two rotary actuators may be attached directly to a 12 tooth gear, and the pair of 12 tooth gears may be provided in engagement with a 32 tooth central spur gear. While the present example shows two actuators, it will be understood that any number of actuators may be used as may be desired.

Figure 3:
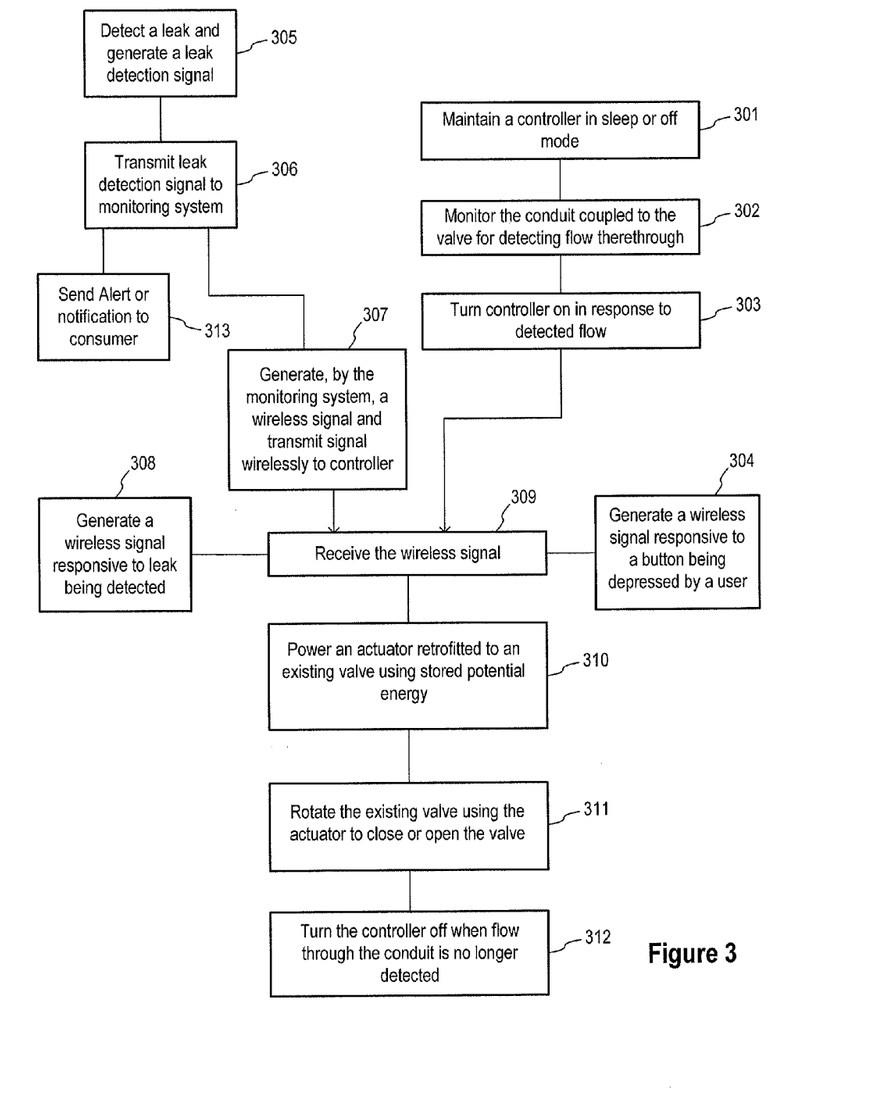
FIG. 3 is a flow chart of an exemplary method according to the present disclosure.

FIG. 3 is a flow chart of an exemplary method according to the present disclosure. An exemplary method for operating a valve which is fluidly coupled to a conduit for flowing a fluid therethrough includes receiving, with controller having a receiver, a wireless signal (as shown in box 309) indicative of an instruction to close the valve, and activating, responsive to the wireless signal, a pneumatically-powered actuator (as shown in box 310) by puncturing a barrier between a pressure source of the pneumatically-powered actuator and an actuation mechanism of the pneumatically-powered actuator. In examples described, the actuation mechanism is mechanically coupled to the existing valve (e.g. manual shutoff valve) and configured to rotate the existing valve response to pressure from the pressure source. In some examples, the method includes rotating with the pneumatically-powered actuator the valve to a closed position, and in some examples, the method further includes rotating the valve with the pneumatically-powered actuator to the open position, as shown in box 311. As such, the consumer may not only prevent damage from leaks using the automatic valve shutoff system but may also re-open the flow of water without necessitating manual manipulation of the water main cutoff valve.

In some examples, and as described above, the method includes maintaining the controller in a standby or sleep mode at times of non-use, as shown in box 301. The controller may be coupled to a vibration sensor, which may for example be a mechanical vibration sensor such as a ball switch. The method may further include monitoring vibration of the fluid conduit (e.g. water supply line) using the mechanical vibration sensor, as shown in box 302. For example, the vibration sensor may be configured to monitor vibrations just upstream of the manual shut off valve and/or at the meter system such that vibrations may be detected when water is flowing from the water main to the building. At times when water is not being used in the home, vibrations will not be detected, and the controller may be turned off or put in sleep/standby mode during periods of non-use.

In response to detecting vibrations in the conduit and/or meter system, the method may further include turning the controller ON or to "listen" mode, as shown in box 303. The receiver of the controller is then able to receive wireless transmissions and remains in listen mode during the period of time while water is flowing through the conduit (e.g. while the conduit continues to vibrate). The method may further include turning the controller OFF or to sleep mode when vibrations are no longer detected, as shown in box 312.

In some examples, a wireless signal may be generated responsive to a leak having been detected by a leak detection system installed in the home, as shown in box 308. In examples, the user may manually initiate the automatic shutoff operation by pressing a button on a remote control, for example as shown in box 304. In some examples, a leak detection signal may be generated by leak/flood detection sensors and/or water pressure sensors installed in the home and the leak detection signal may be transmitted to a monitoring system, as shown in boxes 305 and 306. The monitoring system may be hosted on a networked computer, which may be operated by a third party, such as a service provider or it may be owned by the homeowner. Accordingly, monitoring for leaks may be performed by a third party or the user from a location outside of the home. Responsive to receiving a leak detection signal, a wireless signal may be transmitted to the receiver of the automatic valve shutoff system to initiate the flow cutoff operation, as shown in box 307. In addition to the wireless signal, various other notifications and/or alerts may be sent to a computing device (e.g. a smart phone, tablet, or other computing device) of the consumer or site owner (as in box 313), and the monitoring system may also be configured to record information relating to the leak detection incident.

Some advantages of examples of the present invention have been described herein to facilitate understanding of the disclosure, and others will be appreciated in light of this disclosure. It is to be understood that not all embodiments of the present invention may enjoy all, or even any, of the described advantages.

As described, examples according to the present invention may solve various problems in conventional automatic shutoff valves. Advantages and solutions provided by embodiments of the present invention are provided by way of explanation, and it is to be understood that not all embodiments may exhibit all, or even any, of the described advantages or provide all, or even any, of the described solutions. One known shortcoming of existing automatic shutoff valve systems is that they are costly to install and require installation inline with the existing fluid flow. The present disclosure describes example systems and methods which may not require the installation of a separate valve, but may instead be retrofitted to an existing valve. In some examples, devices according to the present invention include an attachment portion, which is adapted to mate and/or engage with the handle or valve stem of the existing valve. In some examples, and as described herein, the attachment portion may be configured to be mechanically coupled to the valve stem of virtually any standardized shutoff valve. Furthermore, additional leverage may be obtained thought the gearing of the current device when installed in a pass-through configuration over the manual valve (e.g. allowing the manual valve to be operated via the handle).

As will be further appreciated in view of the present disclosure, while conventional automatic valve shutoff systems are generally electro-mechanical solutions, according to the examples herein, pneumatically driven solutions or solutions using other sources of non-electrical power may be implemented, thus obviating the need for providing the device proximate an electrical power source (e.g. plugging it into the grid or providing it with a battery capable of providing sufficient power to turn the handle). Some electrical power may be consumed by the controller, as described herein. The separate valve which is installed in-line with the flow in conventional systems is typically powered by an electrical motor. The use of electrical motors in conventional devices generally requires placing the conventional automatic valve near electrical power or providing the device with large batteries which require frequent replacement. Examples described herein may solve this problem in part by providing a mechanically-powered actuation system and further describe additional features which may reduce or minimize electrical consumption such that the electrical needs of the system, primarily the receiver, may be met by a small button type battery or a small solar panel. Examples of the pneumatically-powered solution described not only provide an inexpensive solution but may also require less service. For example a single commodity $CO_2$ canister may be able to power 5 or 6 instances of actuation of the valve, thus reducing or obviating the need for frequent replacement of the canisters. Furthermore, the automatic valve shutoff system may be provided with a health monitoring sensor such that the controller may detect when the pressure in the canisters is too low to operate the valve, sending an alert to the homeowner to service the system.

Furthermore, and as described, the examples of controllers described herein may typically be in a sleep or standby mode until awoken. The controller may be provided with a wakeup mechanism which is configured to switch the wireless controller ON or to listen or active mode. The controller accordingly does not consume electrical power, or does not consume as much electrical power, while in sleep mode thereby conserving the battery. Upon activation of the controller by the wake-up mechanism, and for the duration while the controller remains in listen mode, the controller may draw only a small amount of power from the battery. Statistics show that typical residential water consumption may be a total of about 45 minutes during a 24 hour period. As the power consumption for the controller is very small in comparison to electrically powered actuators known in the art, sufficient power may be provided by a coin cell battery, which may not need replacement for a year or more, depending on the frequency of activating and using the device.

While specific examples have been described in relation to shutting of water in the context of residential or commercial water supply from the municipality, the automatic valve shutoff system and methods described herein may be equally effective for cutting off flow of virtually any fluid or compressible gas flowing through a conduit. For example, the system may be used to shut off gas flow in anticipation of or after a natural disaster. The shutoff operation may be initiated by individual consumers or by a centralized location, such as the gas company. Existing valves in various industrial operations, such as oil pipe lines or natural gas lines, may be retrofitted with devices according to the present invention to allow for automatic and remote control of said valves. Although the present invention has been described with reference to specific examples, persons skilled in the art will recognize that changes may be made in form and detail without departing from the spirit and scope of the invention.

It is intended that all matter contained in the above description or shown in the accompanying drawings shall be interpreted as illustrative only and not limiting. Changes in detail or structure may be made without departing from the spirit of the invention as defined in the appended claims. In addition, although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method of closing or opening a manual valve coupled to a conduit for flowing a fluid therethrough, the method comprising:
   receiving a signal indicative of an instruction to close the manual valve;
   in response to the signal, removing a barrier provided between a pneumatic pressure source and an actuator coupled to the manual valve, wherein the removing comprises puncturing the barrier using a puncture device or melting the barrier using a chemical process; and
   rotating the manual valve using the actuator driven by the pneumatic pressure source.

2. The method of claim 1, wherein the receiving includes receiving the signal wirelessly using a controller.

3. The method of claim 1, further comprising maintaining a controller coupled to the actuator in sleep mode and activating the controller responsive to flow through the conduit.

4. The method of claim 3, further comprising monitoring the conduit to detect a flow therethrough, and activating the controller responsive to having detected said flow.

5. The method of claim 4, wherein the monitoring comprises monitoring vibrations of the conduit using a tilt switch.

6. The method of claim 1, wherein the rotating includes rotating the valve in a first direction to close the valve, the actuator being further configured to rotate the valve in a second direction opposite the first direction.

7. The method of claim 1, further comprising generating the signal in response to having detected a leak.

8. The method of claim 1, further comprising generating the signal in response to a user pushing a button coupled to a controller configured to activate the actuator.

9. The method of claim 1, wherein the pneumatic pressure source comprises a container enclosing a pressurized gas.

10. The method of claim 1, wherein the pneumatic pressure source comprises a $CO_2$ cartridge.

11. The method of claim 1, wherein the removing comprises puncturing the barrier using a puncture device, and wherein the puncture device comprises a Schrader valve.

\* \* \* \* \*